(12) United States Patent
Gilligan

(10) Patent No.: US 12,223,388 B2
(45) Date of Patent: Feb. 11, 2025

(54) SERIALIZED ARTIFICIAL INSEMINATION STRAWS AND SYSTEMS AND METHODS OF AUTHENTICATION

(71) Applicant: Inguran, LLC, Navasota, TX (US)

(72) Inventor: Thomas B. Gilligan, College Station, TX (US)

(73) Assignee: Inguran, LLC, Navasota, TX (US)

( * ) Notice: Subject to any disclaimer, the term of this patent is extended or adjusted under 35 U.S.C. 154(b) by 1031 days.

(21) Appl. No.: 17/149,449

(22) Filed: Jan. 14, 2021

(65) Prior Publication Data

US 2021/0220105 A1 Jul. 22, 2021

Related U.S. Application Data

(60) Provisional application No. 62/962,704, filed on Jan. 17, 2020.

(51) Int. Cl.
| | | |
|---|---|---|
| G06K 19/06 | (2006.01) | |
| A61D 19/02 | (2006.01) | |
| G06K 7/14 | (2006.01) | |

(52) U.S. Cl.
CPC ......... *G06K 7/1417* (2013.01); *A61D 19/024* (2013.01); *G06K 19/06037* (2013.01)

(58) Field of Classification Search
CPC ............... G06K 7/1413; G06K 7/1417; G06K 19/06037; A61D 19/024
USPC .................................................... 235/462.01
See application file for complete search history.

(56) References Cited

U.S. PATENT DOCUMENTS

| | | | |
|---|---|---|---|
| 9,358,092 B2 | 6/2016 | Sharpe et al. | |
| 9,384,460 B1* | 7/2016 | Grant | G06Q 10/087 |
| 2007/0219925 A1* | 9/2007 | Brookner | G07B 17/00435 |
| | | | 705/62 |
| 2012/0264207 A1 | 4/2012 | Sharpe | |
| 2014/0046126 A1* | 2/2014 | Gilligan | G03C 1/733 |
| | | | 600/35 |
| 2014/0095226 A1* | 4/2014 | Kourkoumelis | G06Q 10/02 |
| | | | 705/5 |
| 2020/0196595 A1 | 3/2020 | Komatsu et al. | |

FOREIGN PATENT DOCUMENTS

| | | |
|---|---|---|
| JP | 2004-303091 A | 10/2004 |
| JP | 2006-350693 A | 12/2006 |
| JP | 2007-164290 A | 6/2007 |

OTHER PUBLICATIONS

Indian Office Action dated Dec. 28, 2022 in related IN Appl. No. 202217040181.
Canadian Office Action issued on Aug. 28, 2023 is related CA Application No. 3167776.
Marshall, Clif. "Integrated Field Data Transfer Using Bar Coded Semen Straws." Proceedings of the 22nd Technical Conference on Artificial Insemination & Reproduction, 2008. pp. 17-23.
International Search Report and Written Opinion dated Mar. 31, 2021.

(Continued)

*Primary Examiner* — Paultep Savusdiphol
(74) *Attorney, Agent, or Firm* — Ryan Christensen; Hashim Rahman

(57) ABSTRACT

The invention provides serialized artificial insemination straws, as well as systems and methods for authentication of the serialized artificial insemination straws.

12 Claims, 2 Drawing Sheets

(56) References Cited

OTHER PUBLICATIONS

Australian Examination Report issued on Jul. 11, 2023 is related AU Application No. 2021209079.
JP Office Action issued on Jul. 20, 2023 is related JP Application No. 2022-543464.
European Search Report issued on Jun. 14, 2023 is related EP Application No. 21741379.8.
NZ Examination Report issued Feb. 28, 2024 in related NZ Application No. 790336.
KR Final Office Action issued on Jun. 26, 2024, in related KR Appl No. 10-2022-7028036, filed on Aug. 12, 2022.

* cited by examiner

SERIALIZED ARTIFICIAL INSEMINATION STRAWS AND SYSTEMS AND METHODS OF AUTHENTICATION

REFERENCE TO RELATED APPLICATIONS

This application claims the benefit of U.S. Provisional Patent Application No. 62/962,704 filed Jan. 17, 2020. The entire disclosure of which is incorporated herein by reference.

BACKGROUND OF THE INVENTION

There is a general need, across industries, to serialize individually packaged products that may share a lot or batch number. Within the artificial insemination (AI) industry for livestock, however, where matings are often carried out between very high genetic merit value animals, each animal only being able to produce a limited number of gametes, the need is especially acute. For the end-user (typically, the entity or individual utilizing the packaged gametes in a mating), the authenticity of the packaged gametes and the identity of the animal that produced them, is of paramount importance. For the manufacturer of the packaged gametes, the need to track the use of the packaged gametes is of equal importance, since doing so allows them to, among other things, manage product inventory and provide value to the end-user, for example, through the use of rebates. Additionally, the cost and complexity of AI in livestock has generally risen, based on the continual adoption of new technologies such as estrus synchronization, estrus detection methods, genomic analysis etc., and this has happened in ways that are not always clear to the owner of the herds (based on assumptions that are not measured in practice) and that may actually provide a limited or even negative economic value if used incorrectly. New methods used in large scale breeding must therefore provide "more for less," with particular emphasis based on convenience or automation. Thus, the need to track not only use of packaged gametes, but their ultimate productivity (e.g., actual successful pregnancies achieved) is of particular importance to both end-users and manufacturers alike.

Cryopreserved, artificial insemination (AI) straws containing sperm cells for use in the artificial insemination in livestock may be held for long periods of time (e.g., years) in a frozen state, may be shipped across international borders and may be used by inseminators who have no direct communication with the source of the sperm cells (i.e., manufacturers). The primary source of information to the end-user has, up until now, typically been limited to information printed directly on the AI straw, which must be legible, intelligible and must be transferred manually to any database tracking the use of the straw. However, this method of information transfer from printed straws to computer databases often results in false or incomplete information, based on human errors or lack of interest in management of data about the straw. Moreover, although manufacturers may benefit by retrieving information from breeding datasets, it is difficult to recover consistent and accurate information. Limited control of tracking the breeding process for individual animals has led to lax and unreliable handling of data capture in many cases, even where the data is desired and needed. Additionally, breeding doses made in different manners (by different methods) and compared in split-sample field trials require additional attributes associated with the dose such as a different marketing code or straw color to track the different treatments, making it difficult to collect data and to use complex comparisons involving multiple treatments. This problem is particularly prominent when breeding is in large herds, which is becoming the global norm. Although diligent breeders may keep good track of the females bred and the AI straws used, there is limited information about the exact times and even micro-geographic (GPS resolved) position of the actual breeding. When calves are born many months after the use of AI straws in breeding, and it is discovered through phenotypic observation or genetic analysis that the calf does not match with the bull that is documented for the mating, the lack of proof about how straws were actually handled during breeding can lead to one or both parties being frustrated or even upset. The owner of the new calf may make a financial claim against the manufacturer for selling incorrectly identified sperm cells, while the manufacturer may defend itself based on lack of verifiable evidence of the mistake actually resulting from the AI straw itself (i.e., the mistake occurred because of end-user error). Additionally, diligent and consistent documentation of AI straw information requires additional time in manual labor, requires users to have minimal skills to read and write, and in some cases AI straws are used by inseminators that do not understand the alphanumeric characters if their native language does not use those characters. Even those who know the characters can make typographical errors during input or may confuse similar names and numbers. An additional issue within the artificial insemination industry is that differential genetic values between male animals result in unit price differences between semen from high-value males and low-value males (price per straw), which can encourage opportunistic forms of counterfeiting, where straws may be printed with the identification information of a high-value male while actually containing semen from a low-value male.

Inventory accounting of "AI straws made" reconciled with "AI straws used" has been assisted by the use of computers, but lacks a globally harmonized method or system that enables the tracking of chain of custody, even as freeze codes (i.e., lots or batches) comprising hundreds of individual AI straws are "broken apart" during distribution for sale, while allowing or increasing the desired levels of data security and privacy restricted to those in the distribution chain. To date, although the straw printing machines facilitate providing serialized numbers (e.g., 1 to N) on each straw printed, straws from different batches (lot numbers or freeze codes) may have identical serial numbers. The industry has failed to implement technology that allows each of many trillions of different individualized straw serial numbers to be issued without duplications. In most cases, serial numbers are not used at all. In the occasional event that manufacturers identify a low-quality batch that they wish to recall (or give a purchase credit or refund) it is difficult to determine where those straws are, if they were already used, etc. With the existing technology, in most cases only fonted (alpha-numerical and logo) information is printed on cryopreservation straws and it is rare to have serialized straw numbers. If straws are serialized, those numbers are rarely documented. In some cases, straws are printed with one dimension (1D) linear barcodes but the data content is limited (e.g., 10-16 numerical characters) and maximized at 20 numerical characters. Thus, the current limited barcodes in use do not provide a method of serialization.

SUMMARY OF THE INVENTION

One embodiment of the invention comprises an artificial insemination (AI) straw comprising a barcode, wherein the barcode encodes a serial number comprising a first set of characters comprising a Standardized Marketing Code (SMC); a second set of characters comprising a Print Run Number (PRN); and a third set of characters comprising a random tag (R-TAG), a concatemer of the first set of characters and the second set of characters constituting an SMC-PRN combination. In a further embodiment, the PRN is randomly selected from a list of PRNs assigned to the SMC. In an even further embodiment, the list of PRNs assigned to the SMC is comprised of at least 999 different numbers. In another embodiment, the R-TAG is selected from a list of valid R-TAGs comprising at least 1000 different numbers. In a yet further embodiment, the list of valid R-TAGs is comprised of numbers randomly selected from a list of at least 50,000 different numbers. In a particular embodiment, the first set of characters is least 3 characters in length. In another embodiment, the second set of characters is at least 5 characters in length. In yet another embodiment, the third set of characters is at least 5 characters in length. In an additional embodiment, the barcode is a two-dimensional barcode, and in a particular embodiment, the two-dimensional barcode is a Data Matrix code.

Another embodiment of the invention comprises a method of authenticating a serial number in a barcode on an AI straw comprising generating a list of valid VNs or valid TENs; providing an algorithm for calculating a VN, or calculating a TEN, from the serial number; comparing a calculated VN to the list of valid VNs or comparing a calculated TEN to the list of valid TENS; and determining whether the calculated VN matches one of the valid VNs or whether the calculated TEN matches one of the valid TENs. In a specific embodiment, the barcode is a Data Matrix code. In another embodiment, the serial number comprises an SMC, a PRN and an R-TAG. In yet another embodiment, the method further comprises the step of receiving and processing Transactional Information (TI) if the calculated TEN matches one of the valid TENs.

An additional embodiment of the invention comprises an artificial insemination (AI) straw comprising a barcode, wherein the barcode encodes a serial number comprising a first set of characters designating an entity; a second set of characters designating a lot or batch of AI straws; and a third set of characters comprising a number randomly selected from a first list of numbers, wherein the first list of numbers is assigned to a concatemer comprising the first set of characters and the second set of characters. In a particular embodiment, the second set of characters comprises a number randomly selected from a second list of numbers, wherein the second list of numbers is assigned to the first set of characters. In a further embodiment, the second list of numbers is comprised of at least 999 different numbers. In another embodiment, the first list of numbers comprises at least 1000 different numbers. In a yet further embodiment, the first list of numbers is comprised of numbers randomly selected from a third list of numbers, wherein the third list of numbers comprises at least 50,000 different numbers assigned to the concatemer comprising the first set of characters and the second set of characters. In another embodiment, the first set of characters is at least 3 characters in length; the second set of characters is at least 5 characters in length; or the third set of characters is at least 5 characters in length. In a specific embodiment, the barcode is a two-dimensional barcode, and in an even more specific embodiment, the two-dimensional barcode is a Data Matrix code. In some embodiments, the entity is a manufacturer, a seller or a distributor of the AI straw. An additional embodiment encompasses a method of authenticating the serial number comprising generating a list of valid verification numbers; providing an algorithm for calculating a verification number using the third set of characters; comparing a calculated verification number to the list of valid verification numbers; and determining whether the calculated verification number matches one of the valid verification numbers. In an additional embodiment, the method further comprises a step of receiving and processing information about an end-user of the AI straw if the calculated verification number matches one of the valid verification numbers.

DETAILED DESCRIPTION OF THE INVENTION

Figure 1:
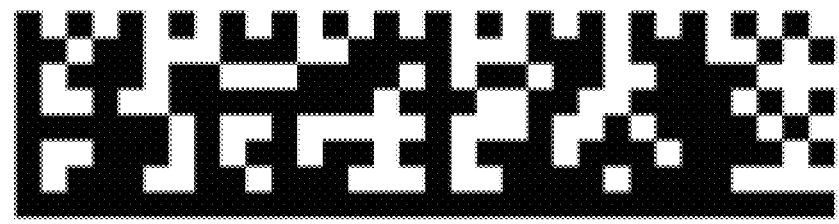
FIG. 1 is an image of an 8×32 Data Matrix barcode encoding a 16-digit serial number comprised of an SMC (consisting of the number 1523), a PRN (consisting of the number 121212) and an R-TAG (consisting of the number 939977).

The instant invention encompasses: a serialized package for a biological product, including an artificial insemination (AI) straw; a method and system for serializing a package for a biological product; a method of authenticating a serialized package for a biological product; and a method of securely transmitting and receiving data or information associated with a serialized package for a biological product between two parties, including product end-users and commercial entities involved in the manufacture, sale or distribution of the product. One aspect of the invention entails the use of a barcode (e.g., a 2D barcode such as a Data Matrix code) able to hold 10 to 20, or 20 or more, numerical characters printed on an individual package for a biological product, such as an AI straw, and the use of a barcode scanner, or imager, for scanning such a barcode. More specifically, one aspect of the invention encompasses generating a unique serial number for a package for a biological product, such as an AI straw, as a data string that is encoded in each barcode.

The term "biological product" as used herein includes, but is not limited to 1) biological samples such as tissue samples (e.g., blood, skin and other cellular samples)—including samples derived from living organisms and cell culture; 2) zygotes, embryos and fetuses, including clones thereof; and 3) gametes. More specifically, the term "biological product" as used herein includes, but is not limited to, semen or sperm cells used for artificial insemination in livestock. It is contemplated that an individual biological product used in the invention is packaged in any suitable package known in the art, including but not limited to, a vial, flask, dish, tube and straw. It is further contemplated that an individual biological product used in the invention is packaged using any suitable device or method known in the art, including but not limited to, an AI straw filling and sealing machine (e.g., a Minitube SFS machine). It is also contemplated that a biological product used in the invention may be fresh, cryopreserved, vitrified or thawed, processed (e.g., sex-sorted sperm cells) or unprocessed, and living or dead.

With respect to sperm cells used for AI in livestock, as noted above, such sperm cells are typically packaged in AI straws. AI straws may contain fresh, or alternatively, cryopreserved (or "frozen"), sperm cells. AI straws may also contain either sex-sorted sperm cells, "conventional" sperm cells (i.e., unsorted sperm cells typically suspended in a supportive media), or unprocessed semen (i.e., "raw ejaculate" or "neat semen"). In the AI industry for livestock, cryopreserved sperm cells packaged in AI straws have historically been tracked using "freeze codes" (each freeze code corresponding to a large number of qualitatively identical AI straws). Since a particular freeze code was often associated with a particular bull and a specific calendar date, multiple AI straws having the same freeze code could often end up being identically labelled, making them impossible to differentiate. In contrast, the instant invention provides for the reliable serialization of individual AI straws (or any other type of package for a biological product), which in turn enables new and valuable practices regarding use of each straw and documentation of their use, as described below.

Serial Number of the Invention

One embodiment of the invention comprises a randomized serialization code (or serial number) comprising a "Random TAG" (or "R-TAG"), which is assigned to, and encoded via barcode on, an individually packaged biological product. A "number" or a "serial number," in the context of the invention, may be comprised of one or more characters. The term "character," as used herein, means a numeral, letter or symbol.

In a particular embodiment, a serial number of the invention comprises three concatenated sets of characters. The first set of characters comprises a "Standardized Marketing Code" (or "SMC"), which in certain embodiments of the invention may be at least 3 characters in length. As used herein, a "Standardized Marketing Code" is a number assigned to a particular entity, such as an entity in a supply chain for a biological product, including but not limited to a manufacturer, a seller or a distributor. The second set of characters comprises a "Print Run Number" (or "PRN"), which in certain embodiments of the invention may be at least 5 characters in length. As used herein, a "Print Run Number" is a number assigned to a particular batch, or lot, of a biological product that is processed and/or packaged, such as cryopreserved sperm cells packaged in AI straws. The third set of characters comprises an R-TAG, which in certain embodiments of the invention may be at least 5 characters in length. As used herein, an "R-TAG" is a number randomly selected from a list of numbers assigned to a particular SMC-PRN combination (i.e., a concatemer comprised of a particular SMC and a particular PRN). The three sets of data described above may be arranged within a concatemer in any order with respect to one another. For example, in one embodiment, a serial number of the invention, as read or in order from left to right, may comprise a concatemer comprising an SMC, a PRN and an R-TAG. In alternative embodiments, a serial number of the invention, as read or in order from left to right, may for example comprise a concatemer comprising: a PRN, an R-TAG and an SMC; a PRN, an SMC and an R-TAG; an SMC, an R-TAG and a PRN; an R-TAG, an SMC and a PRN; or an R-TAG, a PRN and an SMC.

In one embodiment of the invention, a particular entity may be assigned one or more SMCs, and different entities cannot be assigned the same SMC. In a further embodiment of the invention, a list of SMCs and their corresponding assigned entities, may be published or otherwise made publicly available. In an even further embodiment, a set or group of SMCs may be assigned to, or reserved for, entities located in a particular country or geographic region, which may facilitate more rapid and streamlined movement of serialized biological products from nations of manufacture to nations in which end-users of the products are located.

The individualized serial numbers of the invention for each packaged biological product (e.g., an AI straw containing sperm cells) are created using a structured system of randomization for the PRN and the unique R-TAG. As described in more detail below, the first randomization creates a new PRN (a single numerical value to be shared by all packaged biological products in a particular batch, lot or freeze code), but derives the PRN randomly from a large pool of different numbers (such as 999,999 different numbers) assigned to the SMC, so that a party with knowledge of one SMC-PRN combination cannot easily guess other PRNs for the same SMC, since there remains a large set of assigned but unselected PRNs. For example, in one embodiment of the invention, the PRN is randomly selected from a list of PRNs assigned to the SMC, wherein the list of PRNs assigned to the SMC is comprised of at least 999 different numbers. In a further embodiment of the invention, a party's ability to correctly guess additional SMCs may be further reduced by establishing non-random groups of PRNs within a list of assigned PRNs. For example, one could establish non-random groups of PRNs by grouping PRNs based on the jurisdiction or region to which the serialized products are to be shipped. A public list of SMC assignments may be managed by a globally accepted organization. An example in the case of bovine (cattle) breeding is the International Committee for Animal Recording (ICAR) located at Via Savoia 78, sc. A int. 3, 00198 Roma (Italy). Owners of bovine males (bulls) which are to be sold internationally may commonly secure, from ICAR, a stud code (marketing code) which may be assigned to a Semen Collection Center (SCC) or an AI Marketing Organization. Such stud codes represent one embodiment of the SMC as described in the instant invention.

A similar randomization process may also be used to create a list of "valid" R-TAGs from which serial numbers of the invention may be generated. For example, from a potential series of 1 million different numbers assigned to a particular SMC-PRN combination, a limited number of "valid" R-TAGs, such as 5000, are randomly selected. During the barcode printing process, each packaged biological product upon which a barcode is printed is assigned a valid R-TAG. Once a valid R-TAG is encoded into a barcode and printed onto a packaged biological product, that R-TAG (or the serial number comprising the R-TAG) is placed onto a list of "allocated" R-TAGs (or a list of allocated serial numbers) or is designated as an "allocated" R-TAG within the list of valid R-TAGs (or is designated as an allocated serial number within the list of valid serial numbers). Once allocated, an R-TAG for a particular SMC-PRN combination (or the serial number comprising the R-TAG) may not be assigned or printed again. This assures that two identical barcodes will never be printed with the invention, or more specifically, that each individually packaged biological product has a unique serial number that will never be duplicated. Accordingly, a serial number of the invention that comprises an allocated R-TAG may also itself be designated as "valid" or "allocated." After the printing for one lot, or batch (or one freeze code), of a product is completed, the list of valid R-TAGs for that SMC-PRN combination, comprising both allocated and unallocated R-TAGS, is fixed (i.e., will not change).

In a particular embodiment of the invention, only the entity to which a particular SMC is assigned may possess a list comprising all serial numbers comprising the SMC, including all valid and allocated serial numbers. In essence, the entity has a private, secure list that can be used to determine if a serial number of the invention is valid and is allocated or unallocated. Accordingly, so long as the list is not shared with any third party, then any third party submitting a request to the entity to which the SMC is assigned must present a valid and allocated serial number to be considered an authentic request. In a particular embodiment of the invention, an entity to which a particular SMC is assigned may verify or authenticate a serial number submitted to it by a third-party by comparing the submitted serial number to a list comprising valid and allocated serial numbers of the invention. In a further embodiment, if the submitted serial number matches a serial number on the list, the submitted serial number is authentic. In an even further embodiment, the submitted serial number must match an allocated serial number of the invention to be considered authentic.

Barcodes of the Invention

Once a serial number of the invention is generated, another embodiment of the invention comprises a barcode encoding the serial number. It is contemplated that any suitable barcode symbology known in the art, including 1D and 2D barcodes, may be used to encode a serial number of the invention.

One embodiment of the invention comprises encoding a serial number of the invention with a 2D barcode. The graphical appearance of a 2D barcode is generated by using different patterns of dots, squares, circles, hexagons, or other geometric shapes.

In a particular embodiment, a serial number of the invention is encoded with a Data Matrix code. Data Matrix is a well-known 2D barcode symbology that uses an area of square modules with a unique perimeter pattern that assists the barcode scanner in determining dot, or "cell," locations and decoding the symbol. Characters, numbers, text and actual bytes of data may be encoded with Data Matrix code, including Unicode characters and photos.

The following table lists the size and capacity of the various Data Matrix formats.

TABLE 1

| Format Number | Symbol Size (Modules) | Max Numeric Capacity | Max Alphanumeric Capacity | Max Binary Capacity |
|---|---|---|---|---|
| 0 | 10 × 10 | 6 | 3 | 1 |
| 1 | 12 × 12 | 10 | 6 | 3 |
| 2 | 14 × 14 | 16 | 10 | 6 |
| 3 | 16 × 16 | 24 | 16 | 10 |
| 4 | 18 × 18 | 36 | 25 | 16 |
| 5 | 20 × 20 | 44 | 31 | 20 |
| 6 | 22 × 22 | 60 | 43 | 28 |
| 7 | 24 × 24 | 72 | 52 | 34 |
| 8 | 26 × 26 | 88 | 64 | 42 |
| 9 | 32 × 32 | 124 | 91 | 60 |
| 10 | 36 × 36 | 172 | 127 | 84 |
| 11 | 40 × 40 | 228 | 169 | 112 |
| 12 | 44 × 44 | 288 | 214 | 142 |
| 13 | 48 × 48 | 348 | 259 | 172 |
| 14 | 52 × 52 | 408 | 304 | 202 |
| 15 | 64 × 64 | 560 | 418 | 278 |
| 16 | 72 × 72 | 736 | 550 | 366 |
| 17 | 80 × 80 | 912 | 682 | 454 |
| 18 | 88 × 88 | 1152 | 862 | 574 |
| 19 | 96 × 96 | 1392 | 1042 | 694 |
| 20 | 104 × 104 | 1632 | 1222 | 814 |
| 21 | 120 × 120 | 2100 | 1573 | 1048 |
| 22 | 132 × 132 | 2608 | 1954 | 1302 |
| 23 | 144 × 144 | 3116 | 2335 | 1556 |
| 24 | 8 × 18 | 10 | 6 | 3 |
| 25 | 8 × 32 | 20 | 13 | 8 |
| 26 | 12 × 26 | 32 | 22 | 14 |
| 27 | 12 × 36 | 44 | 31 | 20 |
| 28 | 16 × 36 | 64 | 46 | 30 |
| 29 | 16 × 48 | 98 | 72 | 47 |

It is contemplated that any suitable software known in the art for generating Data Matrix barcodes may be used to encode a serial number of the invention.

In another embodiment, a serial number of the invention is encoded with a Quick Response (QR) code, which is another type of 2D barcode. A QR code consists of black squares arrayed within a square grid having a white background.

The following table lists the maximum capacity for a QR code.

TABLE 2

| Input mode | Max. characters |
|---|---|
| Numeric only | 7,089 |
| Alphanumeric | 4,296 |
| Binary/byte | 2,953 |

It is contemplated that any suitable software known in the art for generating QR barcodes may be used to encode a serial number of the invention.

Printing Barcodes of the Invention

Another aspect of the invention encompasses printing a barcode that encodes a serial number of the invention onto an individually packaged biological product, such as an AI straw. As used herein, the term "printing" includes, but is not limited to, etching, marking, melting, coloring, spraying, carving, transferring, indenting, engraving, pressing, painting, drawing, molding and casting. It is contemplated that any suitable method or device known in the art may be used for printing a barcode that encodes a serial number of the invention onto an individually packaged biological product.

For example, a method for printing a barcode onto an AI straw using a laser is disclosed in U.S. Pat. No. 9,358,092, and is hereby incorporated by reference in its entirety. It is also contemplated with respect to an AI straw, that an ink-jet printer (e.g., a Minitube MiniJet printer) or a thermal transfer printer (e.g., Minitube EasyCoder) may be used to print a barcode that encodes a serial number of the invention.

Scanning or Imaging Barcodes of the Invention

Another aspect of the invention encompasses scanning or imaging a barcode that encodes a serial number of the invention with a scanning or imaging device. It is contemplated that any suitable scanning or imaging device known in the art may be used to scan or image a barcode that encodes a serial number of the invention. For example, a Zebra MT2070 scanner (Zebra Technologies Corp., Lincolnshire, Illinois) may be used to scan or image 1D or 2D barcodes of the invention. Generally, a 2D barcode will require an imaging device to in order to be read and decoded.

Authenticating Serialized, Packaged Biological Products of the Invention

Individualized serial numbers of the invention are created using a structured system of randomization for the PRN and the unique R-TAG, and an entity to which a particular SMC is assigned may verify or authenticate a serial number submitted to it by a third-party by comparing the submitted serial number to a list comprising valid and allocated serial numbers of the invention. A further embodiment of the invention allows an entity to which a particular SMC is assigned to securely authenticate a serial number submitted to it by an end-user through a computer program or application provided to the end-user that generates a unique Transaction and Exchange Number (TEN), and to securely receive and transmit unique information associated with the TEN—for example, information about the manner in which the biological product was used (e.g., time and place) and information about the end-user. The term "application," as used herein, means application software, including but not limited to a mobile application and a web application.

Another embodiment of the invention allows an end-user to securely authenticate a packaged biological product by scanning or imaging the barcode on the product using an application or software program provided to the end-user that generates a Verification Number (VN) and to retrieve publicly available information associated or linked with the VN.

Method of Authentication Using a VN

A "Verification Number" (or "VN"), as used herein, is a concatemer comprising a first set of characters comprising an SMC, a second set of characters comprising a PRN and a third set of characters comprising a derivative of an R-TAG or a derivative of a portion of an R-TAG. In one embodiment of the invention, the derivative of an R-TAG, or the derivative of a portion of an R-TAG, in a VN is generated by an algorithm for generating VNs. In a further embodiment of the invention, an algorithm for generating a VN is comprised of a hash function. In a specific embodiment of the invention, a VN is comprised of a "hash key" derived from an R-TAG or a portion of the R-TAG and is used by a scanning or imaging device to provide secure authentication of a serialized packaged biological product of the invention to an end-user (i.e., prove the barcoded product is real and not counterfeit) each time the barcode encoding the R-TAG is scanned or imaged. As such, even if a third-party knows a VN, the third party cannot use the VN to guess, calculate or otherwise reverse engineer serial numbers of the invention.

In a particular embodiment of the invention, a list of VNs generated from each valid R-TAG assigned to a given SMC-PRN combination is securely provided to anyone presenting an allocated serial number comprising the given SMC-PRN combination or an allocated R-TAG for the given SMC-PRN combination. Accordingly, a VN in this embodiment may be considered a "public key."

One embodiment of the invention comprises comparing a received VN with VNs on a list of VNs comprising the same SMC-PRN combination as the received VN, where a "received VN" is a VN generated from a scanned or imaged barcode. A further embodiment comprises determining that the received VN matches one of the VNs on the list and then transmitting, releasing, or allowing access to, data or information associated or linked with the SMC-PRN combination. In the context of AI straws comprising sperm cells, information associated or linked with a particular SMC-PRN combination, may include, but is not limited to, information about the animal from whom the sperm cells were obtained, including its name, birth date, breed, breeding value and industry registration number(s); the freeze date; and the freeze location.

It is contemplated that VN's may be generated by any suitable algorithm or hash function known in the art. With respect to VNs, a particular public algorithm for generating VN's for a 16-digit serial number is described as follows.

1. Choose three prime numbers each greater than 100 and less than 1000, multiply them and take the last three digits of the result and keep it, adding 1 to it to make it into an even number. This is a Prime Derivative Value. For the public key (VN), the algorithm always uses the same three prime numbers.
2. Identify the last 8 digits of the serial number, and sum the individual digits into a two-digit number (always less than 72).
3. Add the number represented by the last 8 digits of the straw serial number and the two-digit number created in step 2 to create a new 8-digit number.
4. Multiply the new 8-digit number from step 3 and the Prime Derivative Value to create a 10 or 11-digit number.
5. Identify the last 5 digits of the 10 or 11-digit number from step 4.
6. Generate a concatemer comprising the identified digits from step 5, and the SMC and PRN of the serial number. This concatemer constitutes the VN. Optionally, the concatemer may further comprise one or more characters, such as "0," so that the VN, like the serial number, is comprised of 16-digits (instead of 15 or fewer digits).

Method of Authentication Using a TEN

An additional embodiment of the invention facilitates the secure transmission and reception of Transactional Information. "Transactional Information" (or "TI"), as used herein, is information or data that a purchaser or end-user of an item provides to an entity, including a manufacturer, seller or distributor of the item, and includes but is not limited to information about the use of the item (e.g., time of use and location of use) and information about the purchaser or end-user (e.g., name and address of the purchaser or end-user). Generally, in the context of the invention, TI is provided by an end-user of an item to a receiving entity in exchange for value. For example, a manufacturer of an item may wish to provide a rebate to the purchaser of the item. In this example, the TI may comprise information about the purchaser, such as his or her name and address and the place and manner of use of the item.

In order for an entity such as a manufacturer to ensure that an appropriate value is exchanged for TI transmitted to it by an end-user (e.g., to ensure that multiple rebates are not issued for the same item, or to ensure that information tracked by the manufacturer pertaining to a particular item is not double counted), the invention provides for the generation of a Transaction and Exchange Number—a "private" key—by an end-user. A "Transaction and Exchange Number" (or "TEN"), as used herein, is a concatemer comprising a first set of characters comprising an SMC, a second set of characters comprising a PRN and a third set of characters comprising a derivative of an R-TAG or a derivative of a portion of an R-TAG, that is linked or associated with Transactional Information. In one embodiment of the invention, the derivative of an R-TAG, or the derivative of a portion of an R-TAG, in a TEN is generated by an algorithm for generating TENs. In a further embodiment of the invention, an algorithm for generating a TEN is comprised of a hash function. In a specific embodiment of the invention, a TEN is comprised of a "hash key" derived from an R-TAG or a portion of the R-TAG.

As noted above, VNs generated from each valid R-TAG assigned to a given SMC-PRN combination are securely provided to anyone presenting an allocated serial number comprising the given SMC-PRN combination or an allocated R-TAG for the given SMC-PRN combination and in this way a VN may be considered a "public key." Moreover, a single VN can be used (i.e., submitted/transmitted) multiple times. In contrast to a VN, a TEN is a unique number and can only be used a single time. Therefore, a TEN may be considered a "private" key. This feature allows an entity such as a manufacturer to ensure that an appropriate value is exchanged for TI transmitted to it by an end-user (e.g., to ensure that multiple rebates are not issued for the same item).

Accordingly, one embodiment of the invention comprises 1) establishing a list of serial numbers associated with a transaction or exchange of value; 2) authenticating a packaged biological product comprising one of the serial numbers associated with the transaction or exchange of value by comparing a received VN with VNs on a list of VNs comprising the same SMC-PRN combination as the received VN, 3) determining that the received VN matches one of the VNs on the list; 4) receiving a TEN and TI and 4) either removing the one of the serial numbers associated with the transaction or exchange of value from the list of serial numbers associated with the transaction or exchange of value, or alternatively, noting or designating that TI has been submitted for the one of the serial numbers associated with the transaction or exchange of value. By removing a serial number associated with a particular transaction or exchange of value from a list of serial numbers associated with that transaction or exchange of value, or alternatively, by noting or designating that TI has been submitted for the serial number, an entity can prevent TI associated with a particular serial number from being submitted more than once, or double-counted.

It is contemplated that TEN's may be generated by any suitable algorithm or hash function known in the art. With respect to TENs, a particular private algorithm for generating TEN's for a 16-digit serial number is described as follows.

1. Choose three prime numbers each greater than 100 and less than 1000, multiply them and take the last three digits of the result and keep it, adding 1 to it to make it into an even number. This is a Prime Derivative Value. For the private key (TEN), a combination of three unique prime numbers is used for each instance.
2. Identify the last 8 digits of the serial number, and sum the individual digits into a two-digit number (always less than 72).
3. Add the number represented by the last 8 digits of the straw serial number and the two-digit number created in step 2 to create a new 8-digit number.
4. Multiply the new 8-digit number from step 3 and the Prime Derivative Value to create a 10 or 11-digit number.
5. Identify the last 5 digits of the 10 or 11-digit number from step 4.
6. Generate a concatemer comprising the identified digits from step 5, and the SMC and PRN of the serial number. This concatemer constitutes the TEN. Optionally, the concatemer may further comprise one or more characters, such as "0," so that the TEN, like the serial number, is comprised of 16-digits (instead of 15 or fewer digits).

In the above private algorithm, the three prime numbers are selected by a receiving entity, e.g., a manufacturer or an entity assigned an SMC, for each serial number associated with a particular transaction or exchange of value. Upon selecting the three prime numbers, the entity transmits them to an end-user. The end-user, in turn, who is provided with a computer program or application comprising the above algorithm, completes step 1—by calculating the Prime Derivative Value using the three prime numbers transmitted to it by the receiving entity—as well as steps 2 to 6.

Systems for Secure Authentication and Transfer of Information Regarding Serialized AI Straws In one aspect, the invention encompasses systems for the secure authentication of serialized, packaged biological products such as AI straws comprising sperm cells. Specific systems of the invention may comprise: a serialized AI straw; a printing device for printing serial numbers on AI straws; a computer-readable media comprising serial numbers, R-TAGs, VNs, TENs or TI, as well as lists thereof, algorithms for generating VNs or TENs, and/or information associated or linked with a particular SMC-PRN combination, including information about an animal from whom sperm cells were obtained, including its name, birth date, breed, breeding value and industry registration number(s), a freeze date, and a freeze location; a scanning or imaging device for scanning or imaging a barcode encoding a serial number; a hand-held device, such as a smart phone, comprising a computer program or application that generates VNs or TENs and receives or transmits TI or other data associated with a serialized AI straw; an input device, including a computer or a keyboard, connected to a printer for inputting information or data, including serial numbers, SMCs, PRNs, R-TAGS, entities to which SMCs are assigned, entity-related information, and animal-related information.

The instant invention encompasses a system for printing AI straws in which straw printers print barcodes (e.g., 1D or 2D barcodes) at specified locations on AI straws, which may then be scanned at the time of use of the AI straws (i.e., insemination). The system assures that all straws have a unique serial number. In one embodiment, the freeze codes created by a manufacturer are assigned by the straw printer to one randomly selected PRN. When combined with an SMC, the SMC-PRN combination creates a unique lot or batch number that allows computer databases, networks and hardware that support the scanning of the barcode to communicate with the appropriate manufacturer or marketing organization and be provided with appropriate lot specific information such as straw volume and color, bull registration number, breed of animal, date and time of manufacture, type of semen (such as sex-sorted or conventional), or other important information. This information may then be provided to supportive farm management systems (applications and animal management computer network tools) in which the identity of the particular female bred with a particular straw is precisely identified so that matings may be planned and subsequently confirmed during the breeding sequence.

Each serial number may be used by a designated algorithm (specified in a manufacturer dataset and/or in scanner or smartphone software, for example) to create a VN. A VN can be used by an end-user controlled device at the time of insemination to verify that the scanned straw's serial number is authentic by comparing the VN with a list of valid VNs for a particular SMC-PRN combination. In one embodiment, a list of VNs is provided by a manufacturer to an end-user via a computer file transfer from the manufacturer to the end-user's system (e.g., a computer, device application, etc.). A VN can also be used, as information provided from an end user to the manufacturer, to request a list of valid VNs for the respectively identified SMC-PRN within the VN, or to provide a request to the manufacturer for more information about the lot associated with the VN. In one embodiment the manufacturer may rely on the fact that the VN used in the communication is an allocated VN, meaning corresponding to a serial number that was actually printed on a straw, as providing a reasonable proof that the request is authentic.

In one embodiment, the manufacturer, upon receipt of a valid VN, may then send a private algorithm to the sender of the VN requesting a communication to return a TEN that matches the VN. The use of a VN and TEN increases the assurance, on both sides of the communication (end-user of the artificial insemination straw and manufacturer of the artificial insemination straw) that they have a secure and authentic relationship, where both parties are bonafide. In such case, where mutually-assured bonafide status is created, then valuable and private Transactional Information (TI), may be securely communicated.

One feature of the invention is that it allows direct communication to be established between an entity to which an SMC is assigned (in the context of AI straws, the party who is generally responsible for the identity of the sperm cells in the straw and the quality of the product) and the end-user—the individual who is using the straw in artificial insemination and who possesses the unique individual straw serial number. Without a barcode, information printed on an AI straw may be insufficient to enable an end-user to contact the owner of the bull or marketing code. In contrast, with the invention, since the scanning of a barcode on each straw is done by a device with a computer processor (for example, a smartphone or tablet or a dedicated hand-held scanning or imaging device) and an internet connection, the application running the scanner can be loaded with an instruction set that determines what the application should do if the end-user chooses to have direct communication with the entity to which the SMC is assigned. In the simplest case, the application may contact the entity to which the SMC is assigned to request the VN list for the particular SMC-PRN combination associated with the scanned AI straw, which allows an end-user to verify the authenticity of the straw in real time. In addition, since the SMC-PRN information is directly identified as a lot number, if the end-user wants to obtain information about the associated bull, the application must be enabled to directly contact the entity to which the SMC is assigned. In the more advanced case, through the use of TENs generated by an application possessed by the end-user, the end-user provides the entity to which the SMC is assigned data about each straw, including the identity of the female, the exact date, time and location of the scan (typically corresponding to the insemination event), and through other information systems, breeding outcomes (e.g., non-return information, confirmed pregnancy information, calving information, etc.). The instant invention, through the use of TENS, also allows restocking arrangements where the information coming in from the scanned straws is used to create a real-time analysis of remaining inventory on each bull and even the reordering of more semen.

In one embodiment of the invention, the entity to which an SMC is assigned may possess and/or control the dissemination of the list of valid serial numbers and allocated serial numbers (i.e., serial numbers actually printed on AI straws), since the knowledge of each one of those numbers may have important value, and the anti-counterfeiting benefit of the invention may be compromised if the lists are widely disseminated to third-parties. The list of valid serial numbers may be used to create a public VN list, which may be supplied to any party with access to an SMC-PRN combination such as a distributor or end-user, or to government regulators, for example.

In general, prior to the invention, the information about each lot of AI straws, and each straw used, flowed in only one direction (i.e., from manufacturer to end-user). In contrast, the invention facilitates the reliable, secure, real-time flow of information from end-users back to manufacturers (and, for example, their distribution chains). Additionally, since the invention provides a secure method for tracking a large number of SMCs that may supply a single end-user, the data analysis of the use of each individual straw in the end-user's breeding operation allows end-users to quickly determine who their AI straw suppliers are at any given time, and more particularly, to obtain information on the time of use of each straw and not just when they are purchased. The invention may also allow a single business entity, such as a large global supplier of artificial insemination straws, by using a multiple of SMC codes, to segment their total production into groups of product lots produced according to different methods or regulatory guidelines. For example, from the same manufacturer, one or more SMC could designate that the product was produced by a sex-sorting method, while a different SMC could indicate the product is not sexed sorted. Relatedly, important globally recognized export guidelines such as CSS certification (in USA) or EU certification (for production in Europe or export to Europe) may represent protocols (methods) that can be uniquely assigned to individual SMC.

A unique feature provided by the secure and serialized AI straws of the invention is that the entity to which an SMC is assigned can provide direct purchase incentives such as rebates, purchase points, lottery type options, etc., to end-users. In this case, the first party to provide a valid TEN for the associated SMC-PRN combination is credited with a valid purchase, while any subsequent (e.g., second or third) submission is invalid, since it could be created by the scanning of a straw which has been used and disposed of. In this case, even end-users who are not scanning the straws during use may choose to retain them until they scan them by a different method. However, the ability to assign some type of non-cash economic value to each straw will naturally incentivize end-users to scan barcoded AI straws. This feature has a high value because the current art of scanning for miniature barcodes on AI straws does not comprise the ability to scan a frozen straw (a straw in liquid nitrogen or cold nitrogen vapor). In most cases, the scanning of a unique straw, which identifies the encoded unique serial number, is only possible when the straw has been thawed, meaning brought to ambient temperature by an appropriate means. In most cases, the straw is thawed momentarily prior to use in AI so appropriate scanning at time of use by device able to at least document the serial number is envisioned. In some cases, where the quality of AI straws may have been compromised or ruined by an unintended thawing event, the invention and related VN, TEN and TI components may allow the manufacturer (or associated distributors in the logistics chain) to require the end user to scan all individual straws for which an end user may seek a credit for the value of the straws or apply for a replacement.

To the extent a manufacturer would like to exchange information with individual parties about AI straws having a particular freeze code, the manufacturer can create a private list of TENs by applying an algorithm for generating TENs to the serial numbers having the particular freeze code. Specifically, assuming an end-user transmits a valid and allocated VN to the manufacturer by scanning an AI straw, the manufacturer in turn provides the end-user with the three unique prime numbers used in the algorithm to generate the TENs. The end-user, using an application comprising the algorithm for generating TENs, uses the three prime numbers to generate a TEN for the serial number of the scanned AI straw, which is then transmitted back to the manufacturer. In some cases, a unique algorithm may be used for each serialized straw. In other cases, a group of VNs provided at the same time may be submitted to the same algorithm to produce TENs. Finally, the manufacturer can check the received TEN(s) against the previously generated list of TENs for the serial numbers comprising the particular freeze code (i.e., SMC-PRN combination). In this way, a manufacturer may authenticate a true end-user by having them provide both a public key and a private key for any individual AI straw, and the end-user can communicate with the manufacturer in a secure manner and without having to provide any (or all) of the actual serial numbers in question.

In one embodiment of the invention, once a group of AI straws has been scanned, an application linked to the scanning or imaging device will generate a log of the scanned serial numbers. The use of private keys (i.e., TENs) is more likely to be important where direct communication from the end-user to the manufacturer is needed, particularly if secure methods are needed to identify the correct end-user for a manufacturer to credit. Specifically, if the scanned serial numbers have value, for example, as proofs-of-purchase, cash or rebate points, coupons, etc., the application can generate TENs as described above to securely communicate with the manufacturer about the straws. Additionally, an end-user, in order to control inventory and restocking of semen may see an advantage in securely transmitting some details from breeding (for example, the date and time of insemination, GPS location, inseminator name, etc.) to the supplier, distributor or manufacturer of the AI straws. The manufacturer (or supplier or distributor) can use the SMC-PRN combination from a public or private key to identify a bull. Additionally, in the case of private keys submitted to it by end-users, the manufacturer can use such private keys to track its inventory of AI straws. If the end user is a third-party inseminator, then private keys may also be used by a computer program managing the insemination service to transmit the number of AI straws used from each bull to the owner of the inseminated females as well as to a database tracking inventory of AI straws controlled by the third-party inseminator.

For example, at the end of a week of breeding using AI straws of many bulls across one or more locations in a dairy group, the end-user of the AI straws may submit a batch request to the manufacturer in order to obtain a rebate. Since the amount and type of rebate may be different depending on the bull or on the type of semen (e.g., conventional vs sex-sorted, or 90% sexed vs 65% sexed), the management computer of the end-user may submit a group of individual public keys (i.e., VNs) to the manufacturer. The manufacturer can then log those keys and send the end-user one or more unique sets of the 3 prime numbers (each for creation of a unique private key, or TEN). The end-user then uses the private keys to derive corresponding TEN keys, each of which are then associated with the original public key. Since the manufacturer is the only party to know which serial numbers are allocated serial numbers for each SMC-PRN combination (i.e., lot number), the manufacturer can then derive a private test list of all private TENs generated for each of the prime number groups when used in the algorithm to derive private keys. In this case, the manufacturer will receive a VN and one or more private keys for each straw and all of those keys will match in the test lists, and with that, even though no single key may uniquely determine the serial number, the perfect series of matches only comes with one serial number. At that time, the manufacturer can then modify the valid straw serial number list by indicating or designating the serial number that have been "redeemed." This approach protects the redemption process (straw value transfer) from unauthorized or counterfeit attempts to claim more than one value for the same straw or to claim value for straws one does not possess.

In one embodiment of the invention, barcodes for use on AI straws may comprise 13 numerical characters. In one embodiment of the invention, barcodes for use on AI straws may comprise 16-20 characters. In another embodiment, barcodes for use on AI straws may comprise no more than 16 numerical characters. In yet another embodiment of the invention, barcodes for use on AI straws may comprise 32 or 44 numerical characters. In addition to a serial number, information encoded in such barcodes may also comprise country of origin, breed of bull, sex ratio, and straw color, for example.

In one aspect of the invention, it is contemplated that barcodes may be scanned by a scanning or imaging device in the field (e.g., at the time of insemination). The scanning or imaging device may then use the straw serial number to retrieve additional information about the AI straw by contacting the entity to whom the SMC is assigned. The scanning or imaging device may comprise software (such as a phone or tablet application) that is in communication with a network from which the additional information is retrieved, or alternatively, the scanning or imaging device may transmit the information encoded by the serial number to a computer readable media (for example, in a computer, a phone or a tablet) that comprises software in communication with a network. In one aspect of the invention, the scanning or imaging device may, prior to scanning, be loaded with information, such as lists of valid VNs which could be scanned, by having such lists supplied to the scanning device from an associated network that has information about which lot numbers (SMC-PRN) have been purchased to an inventory that may be presented to the scanner. In this case, the identity of the bull may be determined at the time of scanning and the breeding plan for each female may confirm or conflict with the bull in the straw in a manner which can facilitate the full compliance to a breeding plan, at time of each insemination. In addition, authenticity of the straw may be determined at the time of breeding.

In one embodiment of the invention, three formats of serial numbers are contemplated. While all three serial number formats comprise an SMC, a PRN and an R-TAG, there are three different sizes in terms of number of digits in a representative serial number. It is contemplated that all three of these formats may be used with either an ink jet printer or with a thermal contact printer. Each format has a one-letter designation (e.g., A, B and C, although any letters may be designated), which may be the first character in the barcode as a prefix to the serial number (the one-letter format designation and serial number together constituting a product code). Since an alphabetical letter typically requires the digital space of two numbers when using a 1D or 2D barcode, the length of each barcode is increased by 2 if letters are used as prefixes. By using such prefix letters, AI straws manufactured and sold with barcodes can be scanned and processed even if the structure of the data format was subsequently changed. In one embodiment of the invention, an "A" format serial number comprises 16 numerical digits (with the prefix the product code is equivalent to 18 numerical digits). This amount of data can be placed in a 1D barcode, but the length of the printed barcode may be too long to readily scan with scanning or imagers devices specified for 1D/2D mixed scanning function. For this reason, in a specific embodiment, an 16-digit "A" format serial number is encoded with a 2D barcode (e.g., 8×32 Data Matrix or higher). A "B" format serial number comprises 13 numerical digits and represents an intermediate format in terms of barcode length. A "C" format comprises less than 13 numerical digits, e.g. 10 numerical digits, and is readily scannable with scanning or imagers devices specified for 1D/2D mixed scanning function, while being sufficiently small in size to be encoded with a 1D barcode. Because of the relatively short length, the C format may be encoded with a 1D barcode. If serial number formats of the invention are adopted across the AI industry, it is possible that no two AI straws are ever printed with the same serial number. For example, serial numbers of the A format, with 10,000 possible marketing codes, 1 million possible freeze codes and 1 million possible individual straws per freeze code, would allow 10 quadrillion serialized AI straws.

Figure 3:
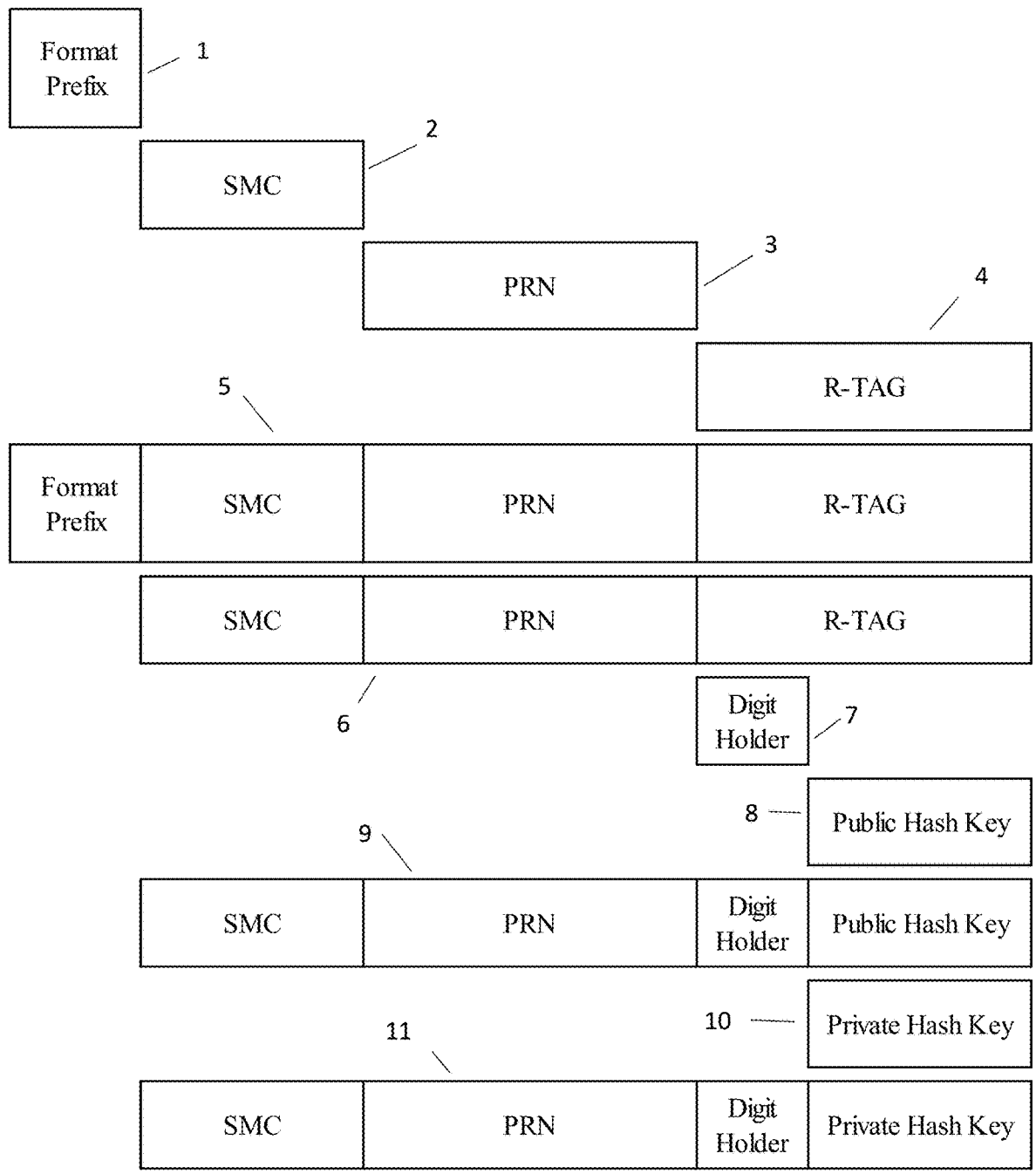
FIG. 3 is a diagram depicting the components of a serial number of the invention, a product code of the invention, a VN, and a TEN.

Referring to FIG. 3 which depicts one embodiment of the invention, a serial number 6 is comprised of an SMC 2, a PRN 3 and an R-TAG 4. A product code 5, in turn, is comprised of a format prefix 1, the SMC 2, the PRN 3, and the R-TAG 4. A VN 9 in this embodiment is comprised of a digit holder 7, the SMC 2, the PRN 3 and a public hash key 8—the digit holder 7 being a numerical placeholder, containing one or more zeros, that makes the length of a VN or a TEN equal in length (i.e., the number of numerical digits) to the corresponding serial number. A TEN 11 in this embodiment is comprised of the digit holder 7, SMC 2, the PRN 3 and a private hash key 10.

One aspect of the invention comprises an AI straw printer comprising software for managing use of serial numbers of the invention as well as a computer readable media for storing files comprising lists of valid or allocated serial numbers or portions of valid or allocated serial numbers, including but not limited to SMCs, PRNs. SMC-PRN combinations, R-TAGs and SMC-PRN-R-TAG combinations. Such a printer may further comprise an input device for manually inputting data, such as a keyboard, as well as a network device or data port for connecting the printer to other devices. It should be understood, however, that the above-listed features (i.e., printer software, computer readable media, keyboard, etc.) for managing use of serial numbers of the invention, may optionally, be included in a separate device, such as a personal computer, which can then, in turn, be connected to an AI straw printer directly (wired or wirelessly) or through a network.

In order to protect all entities using the same serial number format, SMCs may be assigned exclusively by a single governing body. In a specific embodiment of the invention, an appropriate globally recognized organization such as the International Committee for Animal Recording (ICAR) may assign and maintain a list of SMCs and the corresponding assigned entities. One embodiment of the invention comprises a computer readable media comprising a secure input file that designates SMCs to be used by a printing device. In one embodiment of the invention, each SMC on the computer readable media has a dedicated file or folder comprising valid and allocated straw serial number lists associated with the SMC. In a further embodiment of the invention, SMCs may only be added or removed to the computer readable media, or activated or deactivated, through a password protected control area of software.

For AI straws the SMC-PRN combination constitutes a "freeze code," "lot number" or "batch number"—i.e., a number of AI straws comprising sperm cells, with each straw being materially identical. Generally, this means the AI straws having the same SMC-PRN combination contain sperm cells from the same bull and that underwent the same treatment or processing and were frozen at the same time. The most common industry standard for a freeze code designation is a combination of the bull ID, such as a NAAB code or International Animal code and the date of freezing. With respect to designating freeze codes using barcodes, a method comprising a marketing code and a serial number is an accepted alternative. One embodiment of the invention comprises a computer readable media comprising a list of PRNs that have been "closed" for a particular SMC. A "closed" SMC-PRN combination may not be utilized in a serial number again. An SMC-PRN combination may be manually designated by an operator as "closed" in the printer software, for example, after the final list of valid and allocated serial numbers for the SMC-PRN combination is generated, or alternatively, an SMC-PRN combination may automatically be designated as closed by the printer software after the passage of a certain amount of time from the time the first straw bearing the SMC-PRN combination is printed, e.g. 24 hours. In one embodiment of the invention, a file comprising a list of closed PRNs also comprises meta data, such as the date and time that a PRN was established, the date and time a PRN was closed and the IP address assigned to an AI straw printer at that time, and the printing device ID number. Accordingly, when utilizing the invention, AI straws comprising sperm cells from different bulls, or sperm cells that were treated or processed differently, will never have identical SMC-PRN combinations (i.e., freeze codes or lot or batch numbers).

In most cases where AI straws are printed, the manufacturer of the packaged biological product has a separate computer that manages information about each freeze code, including ejaculate quantity and quality information, treatment (such as sex sorted or conventional sperm cells), dose (numbers of millions of sperm in the straw), etc. This means the manufacturer will have a unique Manufacturer Specified Freeze Number (MSFN) that is already in a computer owned by the manufacturer who is operating the straw printer. In one embodiment of the invention, a straw printer is connected to the manufacturer's computer comprising a MSFN either directly (wired or wirelessly) or through a network. When generating a new PRN, an operator manually assigns the new PRN to a MSFN within the printer software, or alternatively, the printer automatically assigns the new PRN to the MSFN. In a particular embodiment, a MSFN must be provided by the manufacturer (either via direct connection to the manufacturer's computer system or via a network) to the printer software before a new PRN can be generated and assigned to the MSFN. For those manufacturers unable to connect their computer to the straw printer, MSFNs may be manually input into the printer software. In a particular embodiment of the invention, printer files comprising lists of SMCs, PRNs, or SMC-PRN combinations, also comprise meta data comprising assigned MSFNs. In a more particular embodiment, printer file names may comprise assigned MSFNs.

The number of possible PRNs is determined by the number of digits in the PRN. To provision for situations where more than one AI straw printer is using the same serial number format (e.g., the A, B, or C formats described above)

and the same SMC, a particular group of PRNs (PRN Groups) for a given SMC may be allocated or assigned to each printer. As an example, the A format described above, with a 6 digit PRN, may comprise 10 PRN Groups, each assigned to a different printer, as follows:

PRN Group 1: Minimum PRN=100,000 and Maximum PRN=199,999
PRN Group 2: Minimum PRN=200,000 and Maximum PRN=299,999
PRN Group 3: Minimum PRN=300,000 and Maximum PRN=399,999
PRN Group 4: Minimum PRN=400,000 and Maximum PRN=499,999
PRN Group 5: Minimum PRN=500,000 and Maximum PRN=599,999
PRN Group 6: Minimum PRN=600,000 and Maximum PRN=699,999
PRN Group 7: Minimum PRN=700,000 and Maximum PRN=799,999
PRN Group 8: Minimum PRN=800,000 and Maximum PRN=899,999
PRN Group 9: Minimum PRN=900,000 and Maximum PRN=999,999
PRN Group 10: Minimum PRN=000001 and Maximum PRN=99,999

As an example, the B format described above, with a 5 digit PRN, may comprise 10 PRN Groups, each assigned to a different printer, as follows:

PRN Group 1: Minimum PRN=10,000 and Maximum PRN=19,999
PRN Group 2: Minimum PRN=20,000 and Maximum PRN=29,999
PRN Group 3: Minimum PRN=30,000 and Maximum PRN=39,999
PRN Group 4: Minimum PRN=40,000 and Maximum PRN=49,999
PRN Group 5: Minimum PRN=50,000 and Maximum PRN=59,999
PRN Group 6: Minimum PRN=60,000 and Maximum PRN=69,999
PRN Group 7: Minimum PRN=70,000 and Maximum PRN=79,999
PRN Group 8: Minimum PRN=80,000 and Maximum PRN=89,999
PRN Group 9: Minimum PRN=90,000 and Maximum PRN=99,999
PRN Group 10: Minimum PRN=000001 and Maximum PRN=9,999

In the case of a 7-digit PRN, 10 PRN Groups may be allocated, where each PRN Group comprises 1 million PRNs rather than 10,000. In each case, PRN Group 1 may be designated as the DEFAULT PRN. In a particular embodiment, use of PRNs from PRN Group 2 occurs automatically once all numbers in PRN Group 1 have been used. Alternatively, if an operator manually switches to a different PRN Group, then all new serial numbers would be comprise a PRN allocated to that new PRN Group. In a specific embodiment, for a specific printer, only one PRN Group may be used at any one time. In another embodiment, management of which PRN Groups are active or inactive at any time may be conducted in a password protected control area in the printer software. PRN Groups comprising PRNs with smaller numbers will generate serial numbers with many zeros, which may be undesirable. Accordingly, in a specific embodiment, the PRN Group with the smallest PRN is designated as the last, or final, PRN Group to be used (e.g., as Group 10 in the above examples).

In one aspect of the invention, a PRN is randomly selected from a list of PRNs assigned to an SMC. Relatedly, a randomized master list of PRN within a specified range may be created in advance so that the printer is simply able to select the next PRN from a random list and is not required to do any random selections. To the extent PRN Groups are implemented, any new PRN to be used is randomly selected from within the active PRN Group on that printer for the respective SMC. Any method, device or software in the art for randomly selecting or generating numbers may be used in the invention.

In general, the following steps are envisioned for generating and printing a serial number of the invention onto an AI straw, and is presented by way of example only:

1. A new PRN is randomly selected from the PRNs in the active PRN Group for an SMC. Alternatively, the next PRN in a pre-existing randomized list of PRNs is selected.
2. The SMC-PRN combination is compared to a list of SMC-PRNs that have already been used to assure the SMC-PRN combination has not been used before.
3. The printer automatically or manually assigns the SMC-PRN combination to an MSFN number (obtained from the manufacturer's computer).
4. A database folder is created for the SMC-PRN combination and named. (The name of the folder could be "A_SMC_PRN_MSFN.abc," for example, where A is the serial number format, SMC PRN is the lot number, MSFN is the manufacturer lot number for the freeze code and abc designates the type of database format.)
5. A list of 5000 valid R-TAGs is used to create a list of 5000 valid individual straw serial numbers, where each serial number is a concatemer of SMC PRN R-TAG.
6. The manufacturer specifies a number of straws to be printed.
7. One of the valid serial numbers is encoded into a 2D barcode and printed onto an AI straw. Optionally, the valid serial number may also be printed on the straw, in appropriate font.
8. The serial number encoded in the printed barcode is then added to a list of allocated serial numbers.
9. The operator may continue to request additional straws to be printed as needed and additional valid straw serial numbers are designated as allocated serial numbers once printed and added the appropriate list.
10. The PRN remains "open" for a number of hours (default=24 hours, for example) if not closed earlier by the operator, before the PRN is closed so that the printer will never print any more straws with the same SMC-PRN (i.e., never issue additional serial numbers associated with the SMC-PRN).
11. Once the PRN is closed, the associated SMC-PRN folder is updated with a final database file, or files, comprising the list of valid serial numbers and the list of allocated serial numbers. (The name of the file could be "A_SMC_PRN_MSFN_V_A.abc," for example, where V is the number of valid straw serial numbers (usually 5000) and A is the number of allocated straws.)
12. The final database file and the SMC-PRN folder are then "write protected" to prevent changes, but allow copies to be made. Optionally, the final database file and the SMC-PRN folder are encrypted as well, using any suitable encrypting method known in the art. (Since each straw printer will comprise archived copies of all valid and allocated serial numbers, the printer may further comprise an encrypted interface if it is connected to a network.)

Another aspect of the invention encompasses a system of oversight and management of multiple printers. With straw printing using ink-jet rates of about 300 straws per minute, and typical batch sizes being below 1000 straws, it is possible to support the printing of the entire production of straws for a large manufacturer in a few hours and with a single printer. However, printing speeds using thermal transfer methods may generally be about 5 to 8 times slower, thus requiring multiple printers to match the output using ink jet methods. In the case where multiple printers are used by a manufacturer, one embodiment of the invention entails each printer transmitting files or data comprising lists of valid and allocated serial numbers to a central or shared computer (for example sent by a file transfer protocol initiated by the printer at designated times). In an additional embodiment, the invention encompasses a secondary system (based on a single folder on each straw printer) that can be accessed without requiring access to the lists of valid and allocated serial numbers. For example, a file (e.g., a Comma Separated Values file, or .csv file) on each printer is updated each time a PRN is closed. This file could then be sent at certain times (one or more times per 24 hour day) or could be requested by file transfer protocol from a server that would have secure access to the printer for the respective folder. Such a PRN history file may have a name such as "PRN_History_1234567" Date.csv," where 1234567 is the device identification number of the straw printer. Such a file could include any new PRN data from the PRN that had been closed by 23:59 local time on the date.

Amongst other information, each line in the PRN history file could provide:
- the device identification number the straws are printed on;
- the IP address of the straw printing device at the time the PRN was closed;
- the lot number (freeze number), i.e., the SMC-PRN combination;
- the opening date and time of the PRN;
- the number of valid straws in the PRN (e.g., 5000);
- the print date, time and number of "test straws" printed (i.e., a test print history);
- the date and time of any obligatory test scans and their results (pass fail or input and read output);
- the start datetime and end datetime and number of straws in the first request for printing (the number of straws in the first set of allocated straw serial numbers);
- the start date and time and end date and time and number of straws in any subsequent request for printing (i.e., the number of straws in the first set of allocated straw serial numbers);
- the closing time of the PRN, and the number of allocated straws in the PRN (i.e., the number of AI straws printed).
- the date and time that the secure file with the PRN specific list of valid and allocated serial numbers was sent to the network; and
- the date and time that the network confirmed the secure copy of valid and allocated serial numbers was transmitted (i.e., receipt confirmation).

In the AI straw industry, operators typically test print a few straws prior to printing all straws. This is especially true for ink-jet printing. The reasons for test printing may not only be to see how the straws look (inspect printed font information), but with respect to barcodes, an operator may also wish to know if a printed barcode is able to be scanned or imaged properly by a scanning or imaging device. In one embodiment of the invention, an AI straw printer may require successful scanning or imaging of a test straw before valid serial numbers may be printed. In a further embodiment, this feature may be disabled by in a password protected control area of the printer software. For example, once a new SMC-PRN (freeze code number) has been created and the operator has associated the correct bull (by manual dropdown) and added the MSFN, a test print could produce 8 to 10 straws. These straws would comprise a special code in each barcode (a serialized test number generated by the test print system) and utilize a two line system where line one comprises what would be printed on the straw (including the barcode) and line two comprises an additional test line that would show the SMC-PRN number and the MSFN number, for example.

In a particular embodiment of the invention, one PRN in each PRN group is designated as a TEST-PRN to be used only for test printing and to be excluded from the list of valid serial numbers and the list of allocated serial numbers. For example, for the A format, PRN numbers 111,111 (Group 1), 222,222 (Group 2), 333,333 (Group 3), etc. would be designated as TEST-PRNs so that those 9 PRNs would never be used to create valid or allocated serial numbers. One example of how this can be accomplished comprises populating the file of used PRNs with these 9 numbers each time a new SMC is authorized for a straw printer. Importantly, if all straw printers used globally also use this suggested method for test printing, then scanning or imaging devices and apps can readily determine that the straw, when printed, was really a test straw.

Example 1

An algorithm for generating a public key (i.e., a VN) from a 16-digit serial number of the invention (specifically, serial number 1523121212939977 having an SMC=1523, a PRN=121212 and an R-TAG=939977; see FIG. 1 for an image of a Data Matrix barcode encoding this serial number) is presented by way of example only, as follows:

1. Select the first three prime numbers over 100, namely 101, 103 and 107. See rows A,B, and C of Table 3, below.
2. Multiply the three prime numbers selected in step 1 above and take the last three digits of the result and keep it, adding 1 to it to make it into an even number. This is the Prime Derivative Value and is always 122 for public keys. See row G of Table 3, below.
3. Identify the last 8 digits of the serial number, i.e., 12939977. See row M in Table 3 below.
4. Sum the last 8 digits of the serial number. See row N of Table 3 below. (The sum will always be less than 72.)
5. Sum the number represented by the last 8 digits of the serial number, i.e., 12,939,977 (see row M in Table 3 below) with the 2-digit number created in step 4 above (see row N of Table 3 below) to create a new 8-digit number, i.e., 12940024. See row 0 in Table 3 below.
6. Multiply the new 8-digit number from step 5 above (see row 0 in Table 3 below) and the 3-digit Prime Derivative Value (see row G in Table 3 below) to create a 10-11 digit number, i.e., 1578682928. See row P in Table 3 below.
7. Identify the last 5 digits of the 10-11 digit number from step 6 above, i.e., 82928. See row Q in Table 3 below.
8. Generate a concatemer comprising the SMC (see row I in Table 3 below), the PRN (see row J in Table 3 below), 0 and the number represented by the 5 digits identified in step 7 above (see row Q in Table 3 below), in that order—this constitutes the VN or public key, i.e., 1523121212082928. See row R in Table 3 below.

TABLE 3

VN from a 16-Digit Serial Number using Public Algorithm

| | | |
|---|---|---|
| A = | 101 = | Fixed Prime Number for Public Key |
| B = | 103 = | Fixed Prime Number for Public Key |
| C = | 107 = | Fixed Prime Number for Public Key |
| D = | 197 = | Variable Prime Number for Private Key |
| E = | 331 = | Variable Prime Number for Private Key |
| F = | 443 = | Variable Prime Number for Private Key |
| G = | 122 = | Public Prime Derivative Value |
| H = | 702 = | Private Prime Derivative Value |
| I = | 1523 = | SMC |
| J = | 121212 = | PRN |
| K = | 939977 = | R-TAG |
| L = | 1523121212939977 = | Straw Serial Number (SMC_PRN_R-TAG) |
| M = | 12939977 = | Last 8 Digits of the Serial Number |
| N = | 47 = | Sum of the last 8 digits of the Serial Number |
| O = | 12940024 = | M + N (New 8-digit Nubmer) |
| P | 1578682928 = | O * G |
| Q = | 82928 = | Last 5 Digits of P (VN Key) |
| R = | 1523121212082928 = | VN (Verification Number) (SMC_PRN_0_VNKey) |

Example 2

An algorithm for generating a private key (i.e., a TEN) from the 16-digit serial number of the invention used in Example 1 above (specifically, serial number 1523121212939977 having an SMC=1523, a PRN=121212 and an R-TAG=939977; see FIG. 1 for an image of a Data Matrix barcode encoding this serial number) is presented by way of example only, as follows:

1. Select three prime numbers, each number greater than 100 and less than 1000. See rows D, E, and F of Table 4, below.
2. Multiply the three prime numbers selected in step 1 above (see rows D, E and F in Table 4 below) and take the last three digits of the result and keep it, adding 1 to it to make it into an even number (i.e., 702)—this is the Prime Derivative Value. See row H of Table 4, below.
3. Identify the last 8 digits of the serial number, i.e., 12939977. See row M in Table 4 below.
4. Sum the last 8 digits of the serial number. See row N of Table 4 below. (The sum will always be less than 72.)
5. Sum the number represented by the last 8 digits of the serial number, i.e., 12,939,977 (see row M in Table 4 below) with the 2-digit number created in step 4 above (see row N of Table 4 below) to create a new 8-digit number, i.e., 12940024. See row 0 in Table 4 below.
6. Multiply the new 8-digit number from step 5 above (see row 0 in Table 4 below) and the 3-digit Prime Derivative Value (see row H in Table 4 below) to create a 10-11 digit number, i.e., 9083896848. See row P in Table 4 below.
7. Identify the last 5 digits of the 10-11 digit number from step 6 above, i.e., 96848. See row Q in Table 4 below.
8. Generate a concatemer comprising the SMC (see row I in Table 4 below), the PRN (see row J in Table 4 below), 0 and the number represented by the 5 digits identified in step 7 above (see row Q in Table 4 below), in that order—this constitutes the TEN or private key for the serial number, i.e., 1523121212096848. See row R in Table 4 below.

TABLE 4

TEN from a 16-Digit Serial Number using Private Algorithm

| | | |
|---|---|---|
| A = | 101 = | Fixed Prime Number for Public Key |
| B = | 103 = | Fixed Prime Number for Public Key |
| C = | 107 = | Fixed Prime Number for Public Key |
| D = | 197 = | Variable Prime Number for Private Key |
| E = | 331 = | Variable Prime Number for Private Key |
| F = | 443 = | Variable Prime Number for Private Key |
| G = | 122 = | Public Prime Derivative Value |
| H = | 702 = | Private Prime Derivative Value |
| I = | 1523 = | SMC |
| J = | 121212 = | PRN |
| K = | 939977 = | R-TAG |
| L = | 1523121212939977 = | Straw Serial Number (SMC_PRN_R-TAG) |
| M = | 12939977 = | Last 8 Digits of the Serial Number |
| N = | 47 = | Sum of the last 8 digits of the Serial Number |
| O = | 12940024 = | M + N (New 8-digit Nubmer) |
| P | 9083896848 = | O * H |
| Q = | 96848 = | Last 5 Digits of P (TEN Key) |
| R = | 1523121212096848 = | TEN (Transaction and Exchange Number) (SMC_PRN_0_TENKey) |

Example 3

Figure 2:
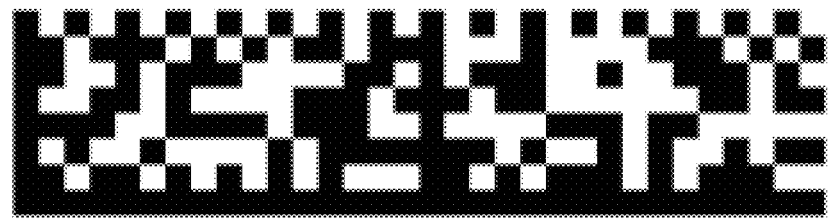
FIG. 2 is an image of an 8×32 Data Matrix barcode encoding a 13-digit serial number comprised of an SMC (consisting of the number 523), a PRN (consisting of the number 12121) and an R-TAG (consisting of the number 39977).

An algorithm for generating a public key (i.e., a VN) from a 13-digit serial number of the invention (specifically, serial number 5231212139977, having an SMC=523, a PRN=12121 and an R-TAG=39977; see FIG. 2 for an image of a Data Matrix barcode encoding this serial number) is presented by way of example only, as follows:

1. Select the first three prime numbers over 100, namely 101, 103 and 107. See rows A,B, and C of Table 5, below.
2. Multiply the three prime numbers selected in step 1 above and take the last three digits of the result and keep it, adding 1 to it to make it into an even number. This is the Prime Derivative Value and is always 122 for public keys. See row G of Table 5, below.
3. Identify the last 8 digits of the serial number, i.e., 12139977. See row M in Table 5 below.
4. Sum the last 8 digits of the serial number. See row N of Table 5 below. (The sum will always be less than 72.)
5. Sum the number represented by the last 8 digits of the serial number, i.e., 12,139,997 (see row M in Table 5 below) with the 2-digit number created in step 4 above (see row N of Table 5 below) to create a new 8-digit number, i.e., 12140016. See row O in Table 5 below.
6. Multiply the new 8-digit number from step 5 above (see row O in Table 5 below) and the 3-digit Prime Derivative Value (see row G in Table 5 below) to create a 10-11 digit number, i.e., 1481081952. See row P in Table 5 below.
7. Identify the last 5 digits of the 10-11 digit number from step 6 above, i.e., 81952. See row Q in Table 5 below.
8. Generate a concatemer comprising the SMC (see row I in Table 5 below), the PRN (see row J in Table 5 below) and the number represented by the 5 digits identified in step 7 above (see row Q in Table 5 below), in that order—this constitutes the VN or public key, i.e., 5231212181952. See row R in Table 5 below.

Example 4

An algorithm for generating a private key (i.e., a TEN) from the 13-digit serial number of the invention used in Example 3 above (specifically, serial number 5231212139977, having an SMC=523, a PRN=12121 and an R-TAG=39977; see FIG. 2 for an image of a Data Matrix barcode encoding this serial number) is presented by way of example only, as follows:

1. Select three prime numbers, each number greater than 100 and less than 1000. See rows D, E, and F of Table 6, below.
2. Multiply the three prime numbers selected in step 1 above (see rows D, E and F in Table 6 below) and take the last three digits of the result and keep it, adding 1 to it to make it into an even number (i.e., 702)—this is the Prime Derivative Value. See row H of Table 6, below.
3. Identify the last 8 digits of the serial number, i.e., 1213997. See row M in Table 6 below.
4. Sum the last 8 digits of the serial number. See row N of Table 6 below. (The sum will always be less than 72.)
5. Sum the number represented by the last 8 digits of the serial number, i.e., 12,139,977 (see row M in Table 6 below) with the 2-digit number created in step 4 above (see row N of Table 6 below) to create a new 8-digit number, i.e., 12140016. See row O in Table 6 below.
6. Multiply the new 8-digit number from step 5 above (see row O in Table 6 below) and the 3-digit Prime Derivative Value (see row H in Table 6 below) to create a 10-11 digit number, i.e., 8522291232. See row P in Table 6 below.
7. Identify the last 5 digits of the 10-11 digit number from step 6 above, i.e., 91232. See row Q in Table 6 below.
8. Generate a concatemer comprising the SMC (see row I in Table 6 below), the PRN (see row J in Table 6 below) and the number represented by the 5 digits identified in step 7 above (see row Q in Table 6 below), in that order—this constitutes the TEN or private key for the serial number, i.e., 5231212191232. See row R in Table 6 below.

TABLE 5

VN from a 13-Digit Serial Number using Public Algorithm (USA Case)

| | | |
|---|---|---|
| A = | 101 = | Fixed Prime Number for Public Key |
| B = | 103 = | Fixed Prime Number for Public Key |
| C = | 107 = | Fixed Prime Number for Public Key |
| D = | 197 = | Variable Prime Number for Private Key |
| E = | 331 = | Variable Prime Number for Private Key |
| F = | 443 = | Variable Prime Number for Private Key |
| G = | 122 = | Public Prime Derivative Value |
| H = | 702 = | Private Prime Derivative Value |
| I = | 523 = | SMC |
| J = | 12121 = | PRN |
| K = | 39977 = | R-TAG |
| L = | 5231212139977 = | Straw Serial Number (SMC_PRN_R-TAG) |
| M = | 12139977 = | Last 8 Digits of the Serial Number |
| N = | 39 = | Sum of the last 8 digits of the Serial Number |
| O = | 12140016 = | M + N (New 8-digit Nubmer) |
| P | 1481081952 = | O * G |
| Q = | 81952 = | Last 5 Digits of P (VN Key) |
| R = | 5231212181952 = | VN (Verification Number) (SMC_PRN_VNKey) |

TABLE 6

TEN from a 13-Digit Serial Number using Private Algorithm

| | | |
|---|---|---|
| A = | 101 = | Fixed Prime Number for Public Key |
| B = | 103 = | Fixed Prime Number for Public Key |
| C = | 107 = | Fixed Prime Number for Public Key |
| D = | 197 = | Variable Prime Number for Private Key |
| E = | 331 = | Variable Prime Number for Private Key |
| F = | 443 = | Variable Prime Number for Private Key |
| G = | 122 = | Public Prime Derivative Value |
| H = | 702 = | Private Prime Derivative Value |
| I = | 523 = | SMC |
| J = | 12121 = | PRN |
| K = | 39977 = | R-TAG |
| L = | 5231212139977 = | Straw Serial Number (SMC_PRN_R-TAG) |
| M = | 12139977 = | Last 8 Digits of the Serial Number |
| N = | 39 = | Sum of the last 8 digits of the Serial Number |
| O = | 12140016 = | M + N (New 8-digit Nubmer) |
| P | 8522291232 = | O * H |
| Q = | 91232 = | Last 5 Digits of P (VN Key) |
| R = | 5231212191232 = | TEN (Transaction and Exchange Number) (SMC_PRN_TENKey) |

As can be easily understood by one of ordinary skill in the art from the foregoing, the basic concepts of the present invention may be embodied in a variety of ways. As such, the particular embodiments or elements of the invention disclosed by the description above, or shown in the figures or tables accompanying this application, are not intended to be limiting, but rather exemplary of the numerous and varied embodiments encompassed by the invention, or equivalents encompassed with respect to any particular element thereof. In addition, the specific description of a single embodiment or element of the invention may not explicitly describe all embodiments or elements possible; many alternatives are implicitly disclosed by the description and figures as may be understood by one of ordinary skill in the art.

What I claim is:

1. An artificial insemination (AI) straw comprising a barcode, wherein the barcode encodes a serial number comprising:
   a first set of characters comprising a Standardized Marketing Code (SMC);
   a second set of characters comprising a Print Run Number (PRN), wherein the PRN is randomly selected from a list of PRNs assigned to the SMC; and
   a third set of characters comprising a random tag (R-TAG),
   a concatemer of the first set of characters and the second set of characters constituting an SMC-PRN combination.

2. The AI straw of claim 1, wherein the list of PRNs assigned to the SMC is comprised of at least 999 different numbers.

3. The AI straw of claim 1, wherein the R-TAG is selected from a list of valid R-TAGs comprising at least 1000 different numbers.

4. The AI straw of claim 3, wherein the list of valid R-TAGs is comprised of numbers randomly selected from a list of at least 50,000 different numbers assigned to the SMC-PRN combination.

5. The AI straw of claim 1, wherein the first set of characters is at least 3 characters in length.

6. The AI straw of claim 1, wherein the second set of characters is at least 5 characters in length.

7. The AI straw of claim 1, wherein the third set of characters is at last 5 characters in length.

8. The AI straw of claim 1, wherein the barcode is a two-dimensional barcode.

9. The AI straw of claim 8, wherein the two-dimensional barcode is a Data Matrix code.

10. A method of authenticating a serial number in a barcode on an AI artificial insemination (AI) straw comprising:
    generating a list of valid Verification Numbers (VNs) VNs or valid Transaction and Exchange Numbers (TENs);
    providing an algorithm for calculating a VN, or calculating a TEN, from the serial number, wherein the serial number comprises a first set of characters comprising a Standardized Marketing Code (SMC); a second set of characters comprising a Print Run Number (PRN) wherein the PRN is randomly selected from a list of PRNs assigned to the SMC; and a third set of characters comprising a random tag (R-TAG);
    comparing a calculated VN to the list of valid VNs or comparing a calculated TEN to the list of valid TENS; and
    determining whether the calculated VN matches one of the valid VNs or whether the calculated TEN matches one of the valid TENs.

11. The method of claim 10, wherein the barcode is a Data Matrix code.

12. The method of claim 10, further comprising the step of receiving and processing Transactional Information (TI) if the calculated TEN matches one of the valid TENs.

* * * * *